Nov. 30, 1926.
L. C. HILL
SEAT FOR MOTOR VEHICLES
Filed August 1, 1918
1,609,249
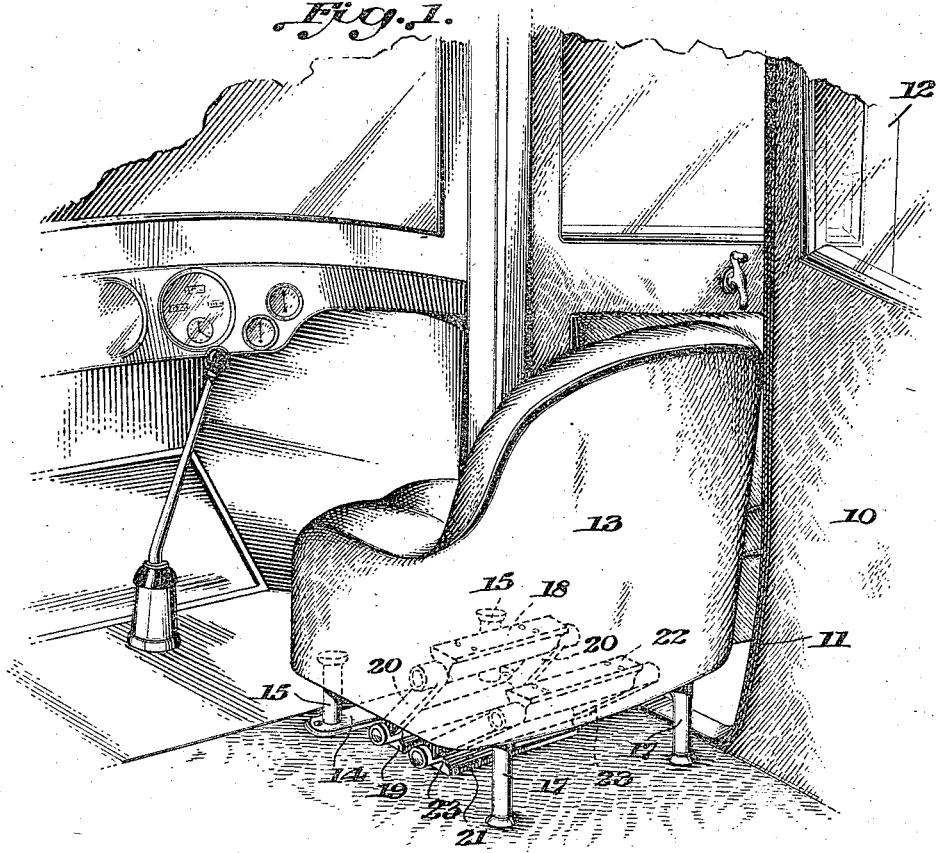
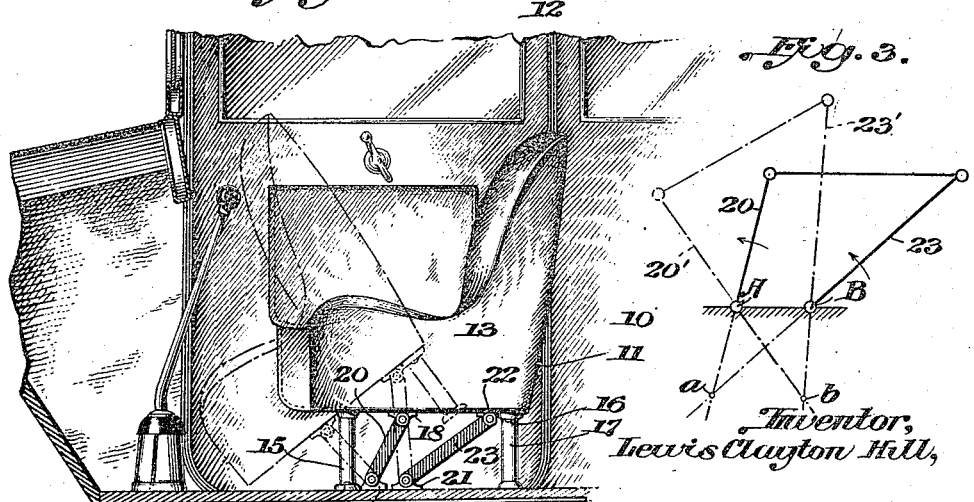
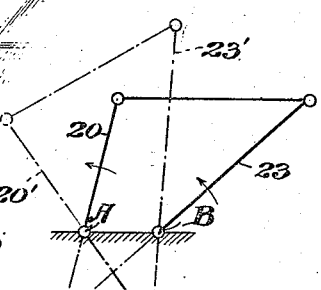
Inventor,
Lewis Clayton Hill,
By Foster Freeman Watson & Coit
Attys Patented Nov. 30, 1926.

1,609,249

UNITED STATES PATENT OFFICE.

LEWIS C. HILL, OF DETROIT, MICHIGAN, ASSIGNOR TO PACKARD MOTOR CAR COMPANY, OF DETROIT, MICHIGAN, A CORPORATION OF MICHIGAN.

SEAT FOR MOTOR VEHICLES.

Application filed August 1, 1918. Serial No. 247,785.

The present invention relates to vehicles and more particularly to a displaceable seat therefor.

In certain types of motor vehicles, for instance the sedan type, a single door is provided in the side of the body and located between the front and rear seats, the front seats being divided so that the latter may be occupied by entering through the door and passing between the front seats. As the vehicles are often driven with the rear seats vacant it would be more convenient if a direct entrance were provided for the front seats. This desirable object has been accomplished in the present invention by mounting a displaceable seat substantially as usual relative to the door, that is to say, entrance to the front seats may be had through a door and in front of said seats. Further, the front seat adjacent the door may be displaced so as to give sufficient space in rear of the same to provide a passage for one desiring to enter the tonneau or occupy the rear seats.

The invention includes the features of the displaceable front seat arranged relative to the door so that entrance is had either in front or rear of said seat, and also includes the manner of mounting the seat so that it may be displaced sufficiently to give a passage in rear of the same from the door to the tonneau.

These features and the preferred construction for accomplishing the same will be apparent from the description taken in connection with the drawings in which:—

Figure 1 is a perspective view of a portion of the inside of the body of a motor vehicle constructed in accordance with the present invention;

Figure 2 is a partial sectional elevation of the body illustrating the position of the front seat relative to the door; and Figure 3 is a diagrammatic view of the linkage for restraining the chair to move in a curved path illustrating the positions of the centers of rotation of the seat.

Referring to the drawings the reference numeral 10 indicates the side of the body of a motor vehicle having an opening 11 therein adapted to be closed by a door 12. A seat 13 faces and is spaced from the instrument board 10ª and is arranged relative to the door so that the front seats may be occupied by passing through the door and in front of said seat 13, the space between the front of the seat 13 and the front edge of the opening 11 being clearly shown in Figure 2. It will be observed, however, that the seat 13 prevents one from passing directly through the door to the tonneau and to permit entering in this manner the seat is mounted so that it may be displaced forwardly to the position indicated in dotted lines in Figure 2, thus providing a passage in rear of the seat for entrance to the tonneau. The structure for supporting and permitting the seat to be displaced comprises a bar 14 secured to the floor of the body in any suitable manner and having the two upright posts 15 on which the front portion of the seat rests, these posts being unattached to the seat. Secured to the rear part of the bottom of the seat as by means of screws 16 are two posts 17 the lower ends of which rest on the floor but are unattached thereto. For the purpose of guiding the seat when it is displaced a linkage is interposed between the bottom thereof and the floor. As shown, a bearing bracket 18 is secured to the bottom of the seat and a similar bearing bracket 19 is secured to the floor slightly in advance of the bracket 18. A pair of links 20 have their ends pivotally connected to the brackets 18 and 19. Secured to the floor and directly in rear of the bracket 19 is a similar bracket 21 and in rear of the bracket 18 is a similar bracket 22 fastened to the underside of the seat, the distance between the brackets 18 and 22 being greater than that between the brackets 19 and 21. A pair of links 23 are pivotally connected at their ends to the brackets 22 and 21, these links being longer than the links 20. It will be observed that the links 20 are inclined slightly to the rear from the vertical passing through the bracket 19 and consequently during the first portion of the displacing movement of the seat the bracket 18 will travel forwardly and upwardly. Likewise the bracket 22 will travel forwardly and upwardly, the upward motion of this latter bracket being greater than that of bracket 18. The resultant motion given to the seat will cause it to be moved forwardly and downwardly over the front posts 15, the rear posts 17 of course moving with the chair as they are secured thereto.

The operation of the linkage will be clear from an examination of Figure 3. The floor corresponds to a fixed link AB, connecting the lower ends of the links 20 and 23 while the seat constitutes a member connecting the upper ends of these links. The full lines in this figure indicate the normal position of the linkage. At the instant the seat begins its displacing movement the center of rotation of the same as a body will be at the point *a*, this center being below the floor of the body. In its final position indicated in dotted lines, the links 20 and 23 assuming the positions indicated at 20' and 23', the center of rotation will be about the point *b* which also lies below the floor of the body. Thus the seat when displaced moves in a curved path, the centers of rotation of the seat always being below the floor. Because of this fact the path of movement of the seat is flatter than if it were pivoted to swing about a point on the floor. Furthermore, because of the flatness of this path of movement the back of the seat when displaced does not strike the instrument board and neither do the posts 17 approach at all closely to a horizontal position which would interfere with the entrance in rear of the seat.

From the foregoing description it will be seen that the chair is loosely supported and yet is guided when displaced so that it affords a maximum opening in rear of the chair. Furthermore, the arrangement of the linkage gives a very substantial construction which prevents movement of the seat when it is occupied.

Although a specific embodiment of the invention has been shown and described, it is understood that the invention is not limited to the exact construction shown but comprehends changes and modifications which are included within the scope of the appended claims.

Having thus described the invention what is claimed as new and desired to be secured by Letters Patent is:

1. In a motor vehicle, in combination, a front seat facing and spaced from the instrument board, a door at the side of the seat, said door and seat being arranged to permit entrance through the door in front of said seat between the seat and instrument board, and means supporting said seat for forward displacement to permit entrance through the door in rear of the displaced seat, said means including a support for the front of the seat secured to the floor and unattached to the seat, a support for the rear of the seat secured to the seat and unattached to the floor, and a linkage independent of said front support operating as the entire means to guide the seat forward and down over said front support.

2. In a motor vehicle, in combination, a front seat facing and spaced from the instrument board, a door at the side of the seat, said door and seat being arranged to permit entrance through the door in front of said seat between the seat and instrument board, and means supporting said seat for forward displacement to permit entrance through the door in rear of the displaced seat, said means including a support for the front of the seat secured to the floor and unattached to the seat, a second support secured to the seat and unattached to the floor one of said supports being disposed in front of the other, and a linkage comprising two links of different lengths independent of said front support, constructed and arranged to guide the seat down over the support secured to the floor.

3. The device according to claim 2 wherein the linkage guides the seat in a curved path, the center of rotation of which is always below the floor.

4. A displaceable seat including in combination, a seat, means to support the same including a post at the front thereof secured to the floor and unattached to the seat, and means to guide the seat forward and down over said post when displaced including a link pivoted at its ends to the floor and seat, and a second longer link disposed in rear of the first link and also pivotally connected at its ends to the floor and seat.

5. In a motor vehicle, in combination, a front seat facing and spaced from the instrument board, a door at the side of the seat, said door and seat being arranged to permit entrance through the door in front of said seat between the seat and instrument board, and means for supporting said seat for forward displacement to permit entrance through the door in rear of said displaced seat, said means including a support for the front of the seat secured to the floor and unattached to the seat, a support for the rear of the seat secured to the seat and unattached to the floor, and a four-bar linkage having a pivotal connection with the floor and the seat constructed and arranged to guide the seat forward and down over the front support.

In testimony whereof I affix my signature.

LEWIS C. HILL.